(12) United States Patent
Morita et al.

(10) Patent No.: US 7,987,938 B2
(45) Date of Patent: Aug. 2, 2011

(54) COOLING DEVICE FOR MOTORCYCLE ENGINE

(75) Inventors: Kenji Morita, Saitama (JP); Shota Suzuki, Saitama (JP); Atsushi Kusuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 628 days.

(21) Appl. No.: 12/055,891

(22) Filed: Mar. 26, 2008

(65) Prior Publication Data

US 2008/0236783 A1    Oct. 2, 2008

(30) Foreign Application Priority Data

Mar. 30, 2007 (JP) .................................. 2007-095487

(51) Int. Cl.
  *B60K 11/04* (2006.01)
  *B62D 61/02* (2006.01)
  *B62M 7/02* (2006.01)
(52) U.S. Cl. ................ 180/68.4; 180/229; 180/68.6
(58) Field of Classification Search .................. 180/68.4, 180/68.6, 229, 219
  See application file for complete search history.

(56) References Cited

U.S. PATENT DOCUMENTS

| 4,979,584 | A * | 12/1990 | Charles ...................... 180/68.1 |
| 6,155,335 | A * | 12/2000 | Acre et al. ................... 165/41 |
| 7,556,115 | B2 * | 7/2009 | Iwanaga ...................... 180/229 |
| 7,637,342 | B2 * | 12/2009 | Iwanaga et al. ............... 180/229 |
| 2003/0168270 | A1 * | 9/2003 | Maeda et al. ................ 180/68.4 |
| 2006/0237175 | A1 * | 10/2006 | Hara ............................ 165/140 |
| 2006/0283647 | A1 * | 12/2006 | Seki et al. .................... 180/219 |

FOREIGN PATENT DOCUMENTS

| JP | 2-18285 | 5/1990 |
| JP | 6-74731 A | 9/1994 |

* cited by examiner

*Primary Examiner* — Hau V Phan
*Assistant Examiner* — John R Olszewski
(74) *Attorney, Agent, or Firm* — Birch, Stewart, Kolasch & Birch, LLP

(57) ABSTRACT

To enable the close arrangement of right and left cooling fans that are common to each other and rotate in the same direction. A radiator is disposed forward of an engine, is horizontally lengthwise and is formed such that the center thereof bends to protrude rearward. A pair of right and left cooling fans is provided on the rear surface of the radiator. The left and right cooling fans have the same specifications, rotating in the same direction. A support plate is provided to surround the cooling fans, that is, to close left and right sides of, the upper side of and the rear of the cooling fans and open the lower side thereof. A partition portion is formed to project from the center of a rear wall to partition between the left and right cooling fans. Thus, the adjacent cooling fans can be prevented from interfering with each other and can be arranged close to each other.

9 Claims, 8 Drawing Sheets

COOLING DEVICE FOR MOTORCYCLE ENGINE

CROSS-REFERENCE TO RELATED APPLICATIONS

This nonprovisional application claims priority under 35 U.S.C. §119(a) on Patent Application No. 2007-095487, filed in Japan on Mar. 30, 2007, the entirety of which is incorporated herein by reference.

BACKGROUND OF THE INVENTION

1. Field of the Invention

The present invention relates to a cooling device for a motorcycle engine. In particular, the present invention relates to a radiator structure for a motorcycle.

2. Background of the Invention

A radiator is used as a cooling device for a water-cooled engine of a motorcycle. Some radiators are provided with a cooling fan. Some horizontally long radiators are provided with right and left cooling fans that are separate from each other. See, for example, Japanese Patent Publication No. Hei 6-74731 and Japanese Utility Model Publication No. Hei 2-18285

If the radiator is provided with right and left cooling fans as described above; however, the right and left cooling fans used are the same in order to keep the cost down. Therefore, the cooling fans rotate in rotation in the same direction. Consequently, the right and left cooling fans must be arranged to be separate from each other in order to avoid mutual interference. This enlarges the width of the radiator and therefore the vehicle. However, if the width of the radiator is made approximately equal to that of a conventional radiator, each cooling fan must be made small. This inevitably lowers the cooling efficiency of the radiator.

SUMMARY OF THE INVENTION

Accordingly, it is an object of the present invention to enable the close arrangement of left and right cooling fans, while a radiator has the same size as a conventional one. Specifically, it is an object of the present invention to provide left and right radiators without enlarging the width of the vehicle.

To solve the above problem, a first aspect of the present invention is directed to a cooling device for a motorcycle engine, wherein the cooling device includes: a radiator disposed in a space forward of a water-cooled engine and rearward of a front wheel; and right and left cooling fans disposed on a rear surface of the radiator; the radiator bends externally of a vehicle body so as to face the front of a vehicle, the right and left cooling fans rotate in the same direction and are disposed on the right and the left with a vehicle body centerline therebetween, a support member supporting the cooling fans is provided rearward of the radiator, and a partition portion is provided on the vehicle body centerline of the support member to prevent exhaust air of the left and right cooling fans from interfering with each other.

According to a second aspect of the present invention, the support member is a cover-like member which covers the rearward of the radiator and which includes an upper wall, right and left lateral walls and a rear wall so as to virtually close a space rearward of the radiator and open a lower surface of the space.

According to the first aspect of the present invention, the supporting member supporting the left and right cooling fans is provided with the partition portion. Therefore, although the cooling fans having the same specifications and rotating in the same direction are used and arranged right and left close to each other to put the partition portion therebetween, exhaust air of the cooling fans can be discharged without mutual interference. Since the left and right cooling fans having the same specifications can be used, cost reduction can be achieved.

In addition, since the radiator bends such that the central portion protrudes rearward and the respective cooling fans are arranged leftward and rightward externally of the this projecting portion, the radiator can be disposed closer to the engine.

According to the second aspect of the present invention, the partition portion is formed like a cover, which closes the space rearward of the radiator from above, from right and left sides and from rear and opens only the lower portion of the space. Thus, exhaust air of the radiator by the cooling fans passes through only the lower portion of the partition portion downward. In other words, the exhaust air can be prevented from moving upward of the vehicle body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
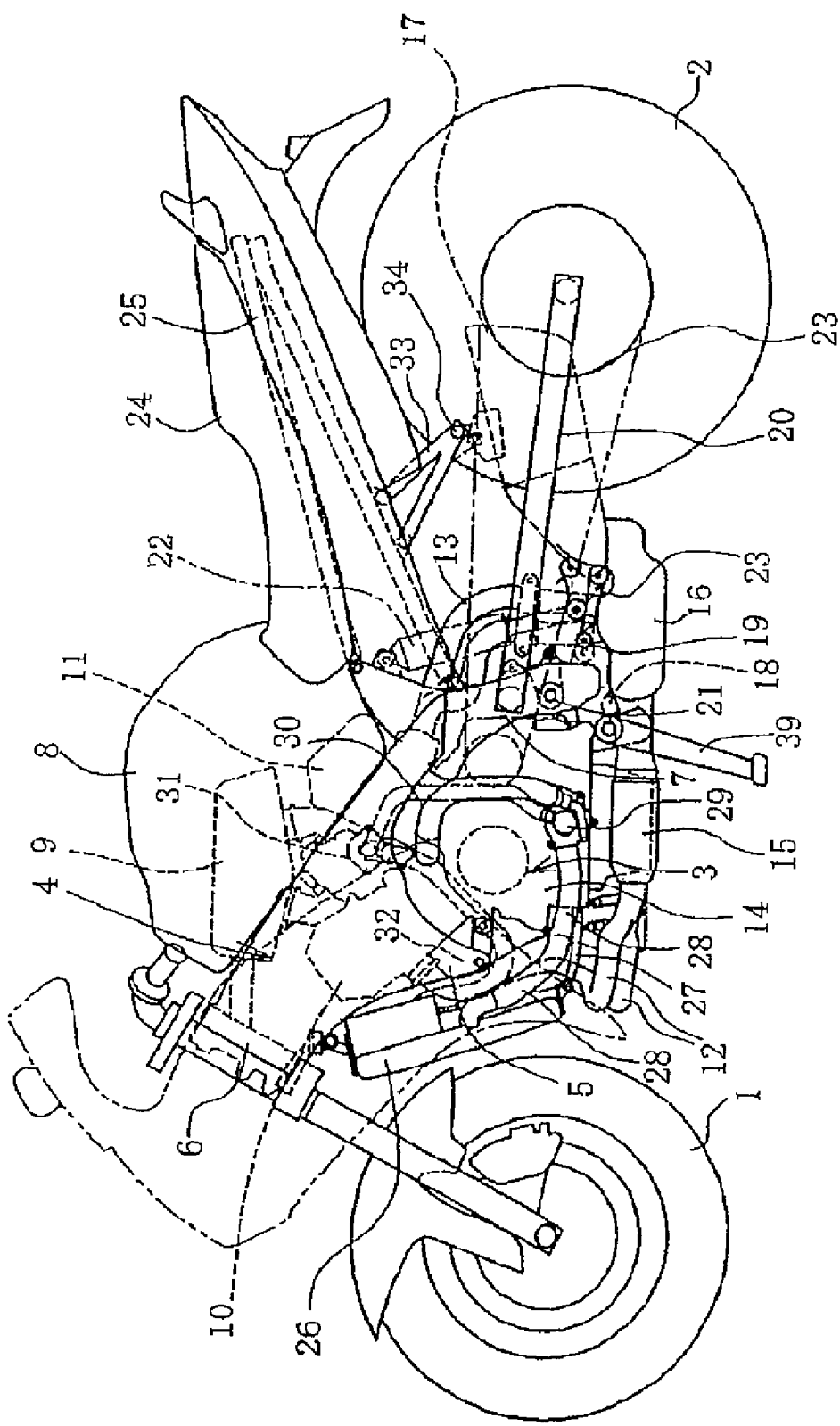
FIG. 1 is a lateral view of a motorcycle according to an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

FIG. 1 is a lateral view of a motorcycle according to an embodiment of the present invention. The motorcycle is such that a V-type water-cooled 4-cylinder engine 3 is disposed between a front wheel 1 and a rear wheel 2 and supported by a body frame 4.

A hanger 5 is attached to the intermediate portion of the body frame 4 so as to support the front portion of the engine 3. A head pipe 6 is attached to the front end of the body frame 4 and a pivot plate 7 is supported by the rear portion of the body frame 4. A fuel tank 8 is supported on the intermediate portion of the body frame 4 and an air intake box 9 is received inside the front portion of the fuel tank 8.

The air intake box 9 sucks air from the front and supplies the air to front cylinders 10 and rear cylinders 11 located below the air intake box 9. The air intake box 9 is disposed above the valley portion between the front cylinders 10 and the rear cylinders 11.

Front side exhaust pipes 12 extend forward from the respective front cylinders 10 and rear side exhaust pipes 13 extend rearward from the respective rear cylinders 11. The front side exhaust pipes 12 extend downward along the front surface of a crankcase 14 of the engine 3 and connect, from the front, with a catalyst chamber 15 located below the crankcase 14, via a collecting pipe. Also, the rear side exhaust pipes 13 connect, from the front, with the catalyst chamber 15 via another collecting pipe as described later.

The catalyst chamber 15 connects with an exhaust chamber 16. An expansion chamber is disposed rearward thereof. The exhaust chamber 16 is disposed in a space defined between the lower portion of the crankcase 14 and the rear wheel 2 and connects with a muffler 17 extending on the right side of the rear wheel 2 with respect to the vehicle body. The exhaust chamber 16 is supported by the lower end of the pivot plate 7 at two, front and rear, attachment portions 18, 19.

A suspension link 23 is provided between the lower end of the pivot plate 7 and the intermediate portion of the attachment portion 18. The exhaust chamber 16 is disposed below the suspension link 23 so as to avoid the suspension link 23. The front end of the muffler 17 is located at a position approximately equal to that of the suspension link 23 higher, by one step, than the exhaust chamber 16.

The rear wheel 2 is of a shaft drive type and is driven by the engine 3. A seat 24 is supported on a seat rail 25 so as to be located above the rear swing arm 20 and rearward of the fuel tank 8. The seat rail 25 is supported by the pivot plate 7 at its front end.

A radiator 26 is disposed forward of the front cylinders 10 and rearward of the front wheel 1 and has an upper portion suspended and supported by the front portion, of the body frame 4, close to the head pipe 6. The radiator 26 is supported with the head bent forward in which the upper portion is slanted forward. A gap is defined between the radiator 26, and the front cylinders 10 and the crankcase 14. The front side exhaust pipes 12 are vertically passed through the gap.

The lower end of the radiator 26 is supported by the crankcase 14 via a stay 27 extending forward from the front lower portion of the crankcase 14. A feed-water hose 28 extends rearward from a lateral tank of the radiator 26 and connects with a feed-water pump 29 provided at the lateral portion of the crankcase 14.

Water is fed from the feed-water pump 29 via a joint hose 30 to a water jacket feed-water portion provided in the valley between the front cylinders 10 and the rear cylinders 11. The water is then fed from the water jacket feed-water portion to the respective water jackets of the front cylinders 10 and the rear cylinders 11. The water circulates the water jackets to cool the cylinders for heat exchange and the water thus heated is fed to a return hose 32 via a thermostat 31 located above the feed-water portion in the valley between the front cylinders 10 and the rear cylinders 11.

The return hose 32 extends downward to the lateral surface of the crankcase 14, then extends forward, and connects with the lateral tank of the radiator 26. In this way, the heated water is returned by the return hose 32 to the radiator 26.

Figure 2:
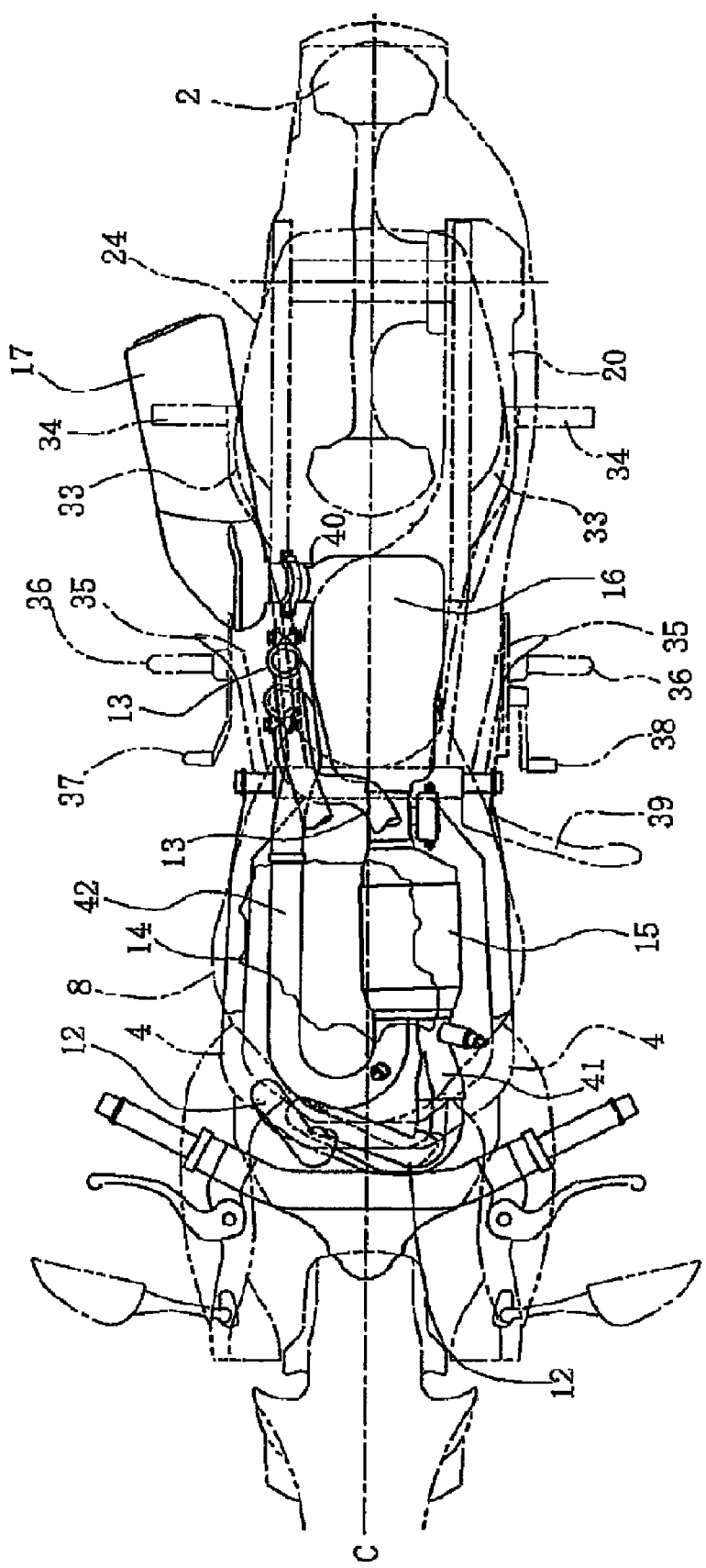
FIG. 2 is a plan view mainly illustrating an exhaust system.

FIG. 2 is a plan view mainly illustrating an exhaust system. The catalyst chamber 15 is disposed to be leftward offset with respect to the body center C and the exhaust chamber 16 is located approximately on the body center C. A laterally-facing outlet pipe 40 is provided at a right-hand rear end portion of the exhaust chamber 16 so as to project rightward outwardly and is joined to the left-lateral surface of the front end of the muffler 17. The muffler 17 is disposed to extend in the back and forth direction and is slanted so that its rear side opens outwardly toward the right side of the vehicle body.

The two front side exhaust pipes 12 are provided in total for the respective left and right cylinders. The front side exhaust pipes 12 extend downward and toward the right side of the vehicle body, bend at their lower portions and cross the vehicle-widthwise direction from the right side of the vehicle body to the left side, collectively join to the collecting pipe 41 and connect with the catalyst chamber 15. Also, the two rear side exhaust pipes 13 are provided in total for the respective left and right cylinders, extend downward, and collectively join to the single rear collecting pipe 42. The rear collecting pipe 42 extends downward of and rightward of the crankcase 14 not to interfere therewith, extends from the rear to the front, turns leftward of the vehicle body at a position close to the lower portions of the front side exhaust pipes 12, and connects, from the front, with the catalyst chamber 15 inward of the front collecting pipe 41. The crankcase 14 partially overlaps the catalyst chamber 15 and rear collecting pipe 42 as viewed from above.

Reference numeral 33 is a pillion step holder, which is provided right and left of the vehicle body. The right pillion step holder 33 supports the muffler 17 at its lower end portion. Reference numeral 34 denotes a pillion step and reference numeral 35 identifies a step holder supported by the seat rail 25. Reference numeral 36 identifies a step, 37 identifies a brake pedal, 38 identifies a change pedal and 39 identifies a side stand. These components are supported by the lower portion of the pivot plate 7.

Figure 3:
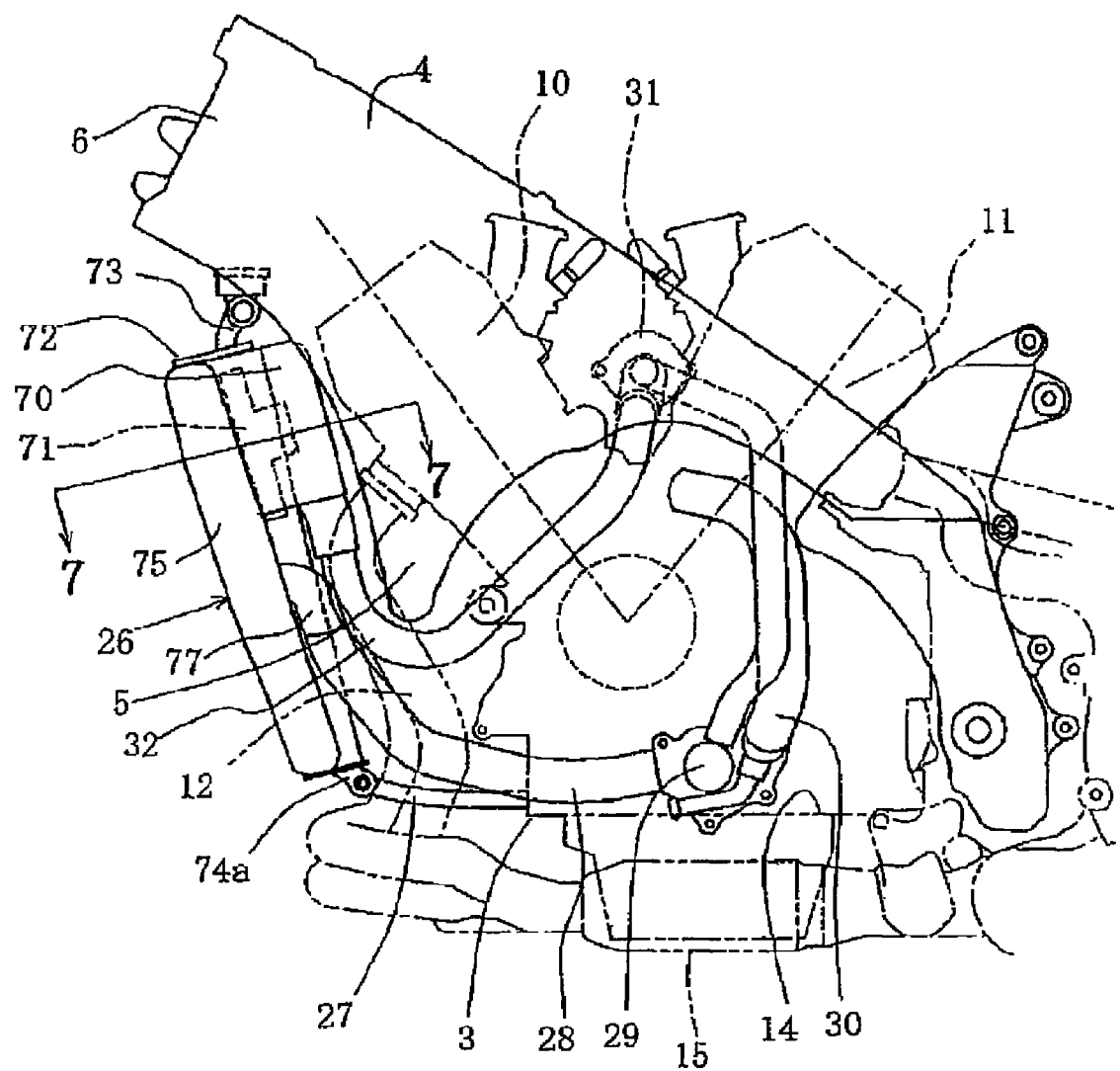
FIG. 3 illustrates an engine from the rear.

FIG. 3 is a lateral view mainly illustrating the radiator The rear surface of the radiator 26 is covered by a support plate 70. Cooling fans 71 are received inside and are disposed at the upper portion of the support plate 70. The upper end of the support plate 70 is abutted against the lower surface of an upper frame 72, which supports the top of the radiator 26 and projects rearward therefrom. Stays 73 extend upward from the upper surface of the upper frame 72 and are secured to the front lower surface of the body frame 4. The lower end of the radiator cover 70 reaches the vicinity of a lower frame 74 which supports the bottom portions of lateral tanks 75 and extends rearward. A bracket 74*a* projects downward and rearward from the lower frame 74. The lower frame 74 is located above the front end portions of the front side exhaust pipes 12, the front end portions bending sideways at a position below the front side exhaust pipes 12.

Figure 4:
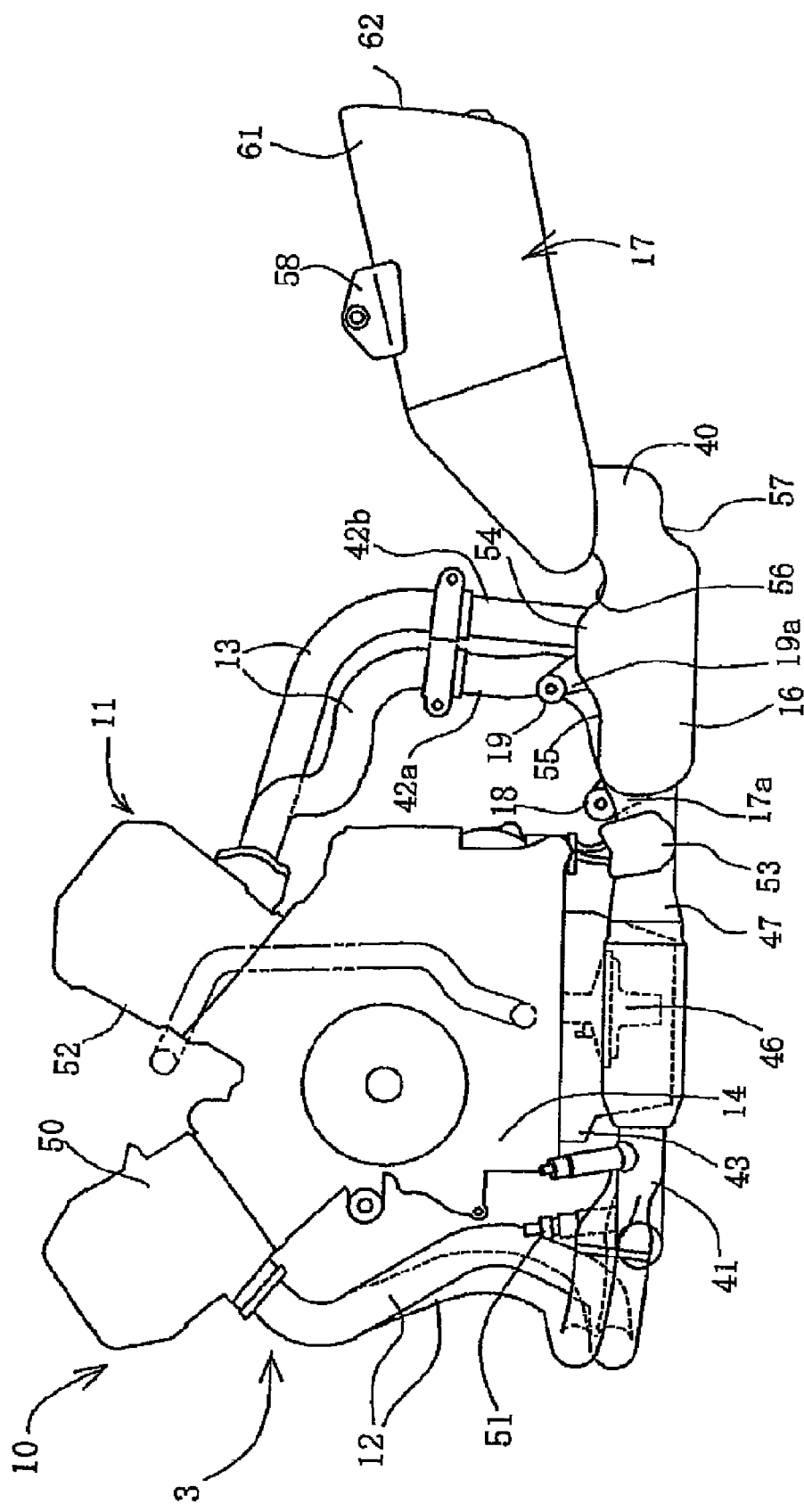
FIG. 4 is a lateral view of the exhaust system.

The exhaust system is hereinafter described in further detail. FIG. 4 is a lateral view of the exhaust system. Cylinder heads 50 of the front cylinders 10 are provided on the right and left. The two front side exhaust pipes 12 connected to the respective exhaust ports of the cylinder heads 50 extend downward in front of the crankcase 14, bend at their lower ends, and connect with the approximately Y-shaped front pipe 41. The rear side of the front collecting pipe 41 is formed as a single one, which connects with the catalyst chamber 15. An $O_2$ sensor 51 is provided right before the joint portion with the catalyst chamber 15 so as to project upward from the upper surface thereof.

Incidentally, another $O_2$ sensor 51 is provided, so as to project upward, at a position close to the joint portion between the catalyst chamber 15 and the rear collecting pipe 42 which cannot be seen in the figure because of being superposed by the front collecting pipe 41. The $O_2$ sensor 51 measures oxygen concentration in exhaust gas before purification.

Cylinder heads 52 of the rear cylinders 11 are provided right and left. The two rear side exhaust pipes 13 connected to the respective exhaust ports of the cylinder heads 52 extend obliquely downwardly and rearward, bend at a position above the exhaust chamber 16, extend approximately vertically downwardly, and connect with branch portions 42*a*, 42*b* of the rear pipe 42, which is also approximately Y-shaped.

A drive portion of an exhaust throttle valve 53 is provided, so as to be exposed, at the lateral surface of the rear exhaust pipe 47, which connects the rear portion of the catalyst chamber 15 with the front portion of the exhaust chamber 16. The exhaust throttle valve 53 is designed to control an amount of exhaust gas by changing the passage-sectional area of the rear exhaust pipe 47 according to the traveling conditions.

The respective bottom surfaces of the catalyst chamber 15 and the exhaust chamber 16 are located on respective horizontal lines H having approximately the same height to ensure a sufficient minimum ground clearance. However, the vertical width (thickness) of the exhaust chamber 16 is greater than that of the catalyst chamber 15. The exhaust chamber 16 ensures the necessary vertical width by extending the upper surface upward. This is enabled by disposing the exhaust chamber 16 in the space located between the lower portion of the engine 3 and the rear wheel from front and from rear and by using the space formed below the rear swing arm 20 (FIG. 1) located above the exhaust chamber 16.

The exhaust chamber 16 is formed with a raised portion 54 at the intermediate portion of the upper surface thereof. Recessed portions 55, 56 are respectively provided forward of and rearward of the raised portion 54. The recessed portion 55 is adapted to avoid the lower end portion of the pivot plate 7 and similarly the recessed portion 56 is adapted to avoid the suspension link 23.

The attachment portion 18 is provided at the end of a stay 18a upwardly projecting from the front end of the exhaust chamber 16. Similarly, the attachment portion 19 is provided at the end of a stay 19a upwardly projecting from the raised portion 54 of the exhaust chamber 16. Thus, the exhaust chamber 16 is rubber-mounted to the pivot plate 7. The outlet pipe 40 extends rearward from the rear end of the exhaust chamber 16 while being reduced in diameter. To form the outlet pipe 40, a recessed portion 57 is formed by reducing the diameter of the rear end portion of the exhaust chamber 16.

The muffler 17 includes a front portion 60 formed in an approximate triangle and a main body portion 61, which are lined and welded integrally with each other. The outlet pipe 40 is joined to the lateral surface of the front portion 60 close to an acute front end portion 60a thereof. An upper surface 60b of the front portion 60 is formed as a taper surface which extends forwardly and obliquely downwardly. The front end portion 60a of the front portion 60 partially overlaps the rear end portion of the exhaust chamber 16 at a portion of the outlet pipe 40.

The main body portion 61 is formed like a tube having an approximately uniform diameter. A rear end portion of the main body portion 61 is closed by an end cap 62 whose upper portion projects rearward from the other portion. Reference numeral 58 identifies a stay attached to the pillion step holder 33 (FIG. 1).

Figure 5:
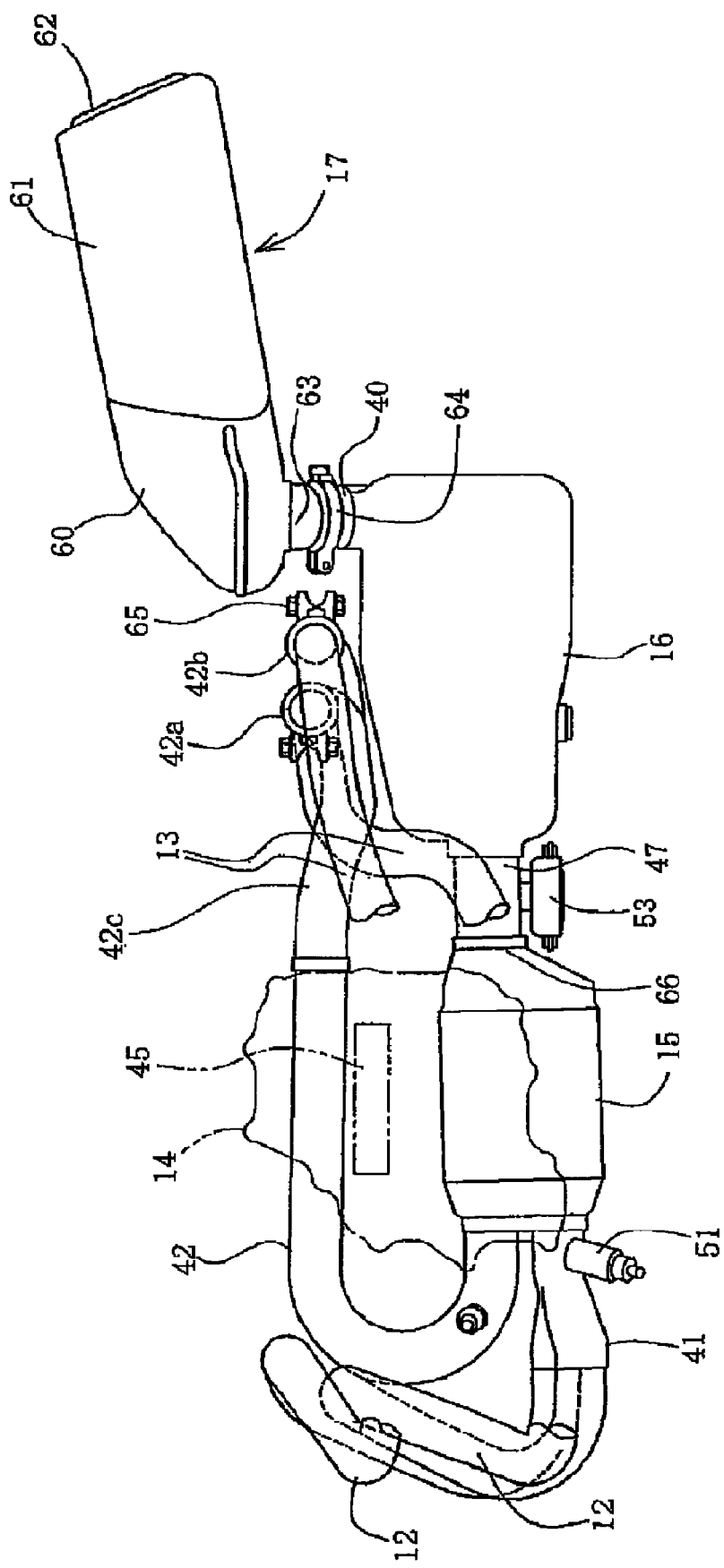
FIG. 5 is a plan view of the exhaust system.

FIG. 5 is a plan view of the exhaust system. The front side exhaust pipes 12 have respective lower portions which bend widthwise of vehicle at a position forward of the rear collecting pipe 42. The front side exhaust pipes 12 overlap one on another. The rear side exhaust pipes 13 overlap one another along the right-hand surface of the exhaust chamber 16, extend rearward to the vicinity of the outlet pipe 40, then bend downward, and connect with the branch portions 42a, 42b of the rear collecting pipe 42.

The outlet pipe 40 projects rightward from the internal surface of the rear end portion of the exhaust chamber 16 and is connected to a front pipe 63 with a band 64. This front pipe 63 projects leftward from the internal surface of the front end portion of the front portion 60. The front pipe 63 serves as an inlet pipe of the muffler 17.

The joint portion between the outlet pipe 40 and the front pipe 63 is located slightly rearward from the front end portion 60a of the front portion 60 of the muffler 17 to form a space there A band 65 used to secure a joint portion between the rear side exhaust pipe 13 and the rear collecting pipe 42 partially faces this space. Am external surface 60c of the front portion 60 of the muffler 17 is formed as a taper surface which slants so that its front side faces the central side of the vehicle body.

An external surface 15d of a rear wall 15c of the catalyst chamber 15 is formed as a taper surface whose rear side enters inside the vehicle body and is reduced in diameter to have approximately the same diameter as that of the rear exhaust pipe 47. A recessed space surrounded by the rear wall 15c and the front wall 16a of the exhaust chamber 16 is formed externally of the rear exhaust pipe 47. The exhaust throttle valve 53 is received in this recessed space to be protected from disturbance such as scattered stones or the like.

Figure 6:
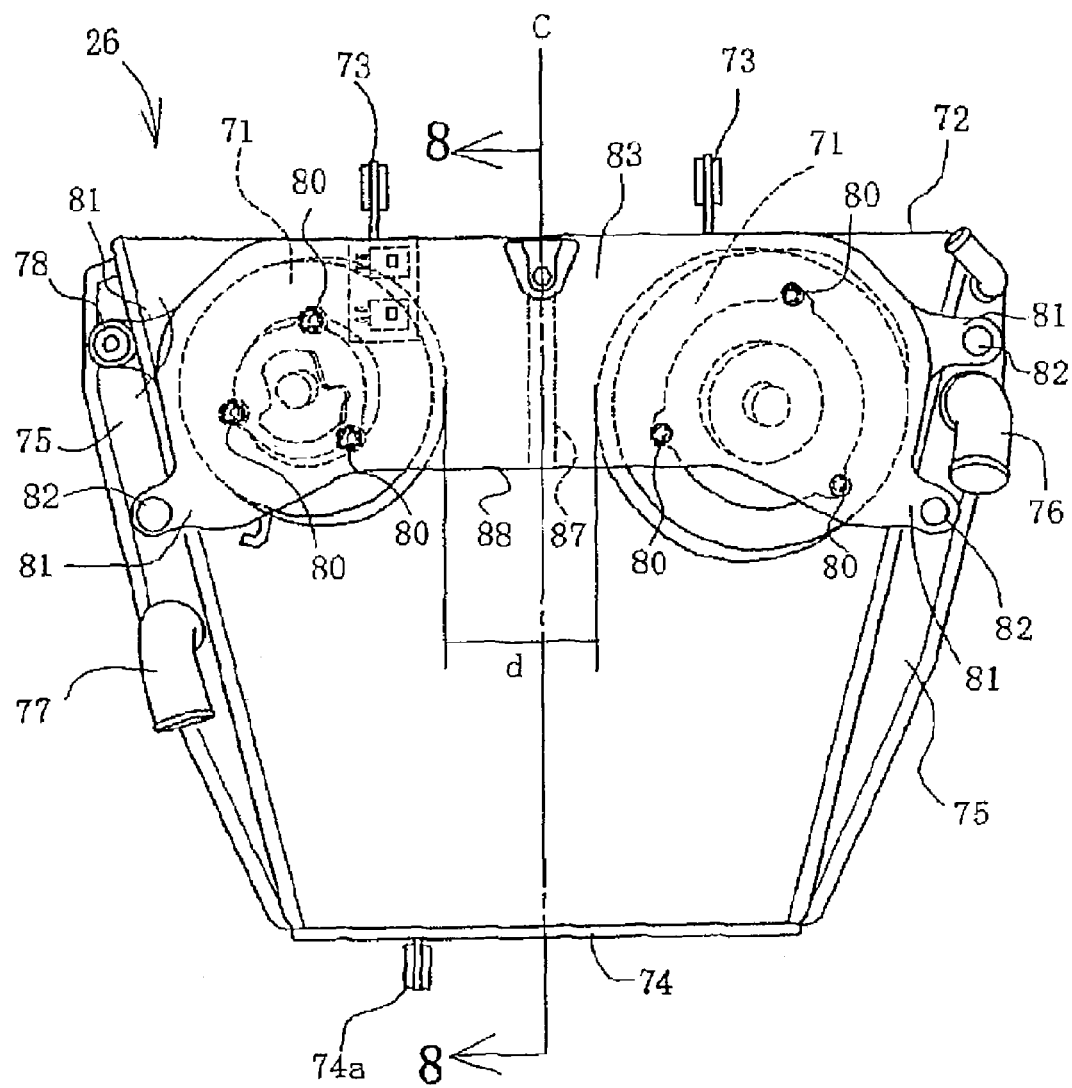
FIG. 6 is an enlarged lateral view illustrating a portion mainly including a muffler.

The cooling device of the water-cooled engine is next described in detail. FIG. 6 is a rear view of the radiator 26. The radiator 26 is analogous to the shape of an inverted trapezoid having a wide upper portion and a narrow lower portion and is provided with the right and left lateral tanks 75. The right-hand lateral tank 75 is provided with a return side joint pipe 76 at an upper portion thereof and the left-hand lateral tank 75 is provided with a feed-water side joint pipe 77 at a vertically intermediate portion thereof. The right-hand and left-hand lateral tanks 75 are each provided with an attachment boss 78 at its upper portion.

The support plate 70 is provided at the upper portion of the radiator 26 and at a height corresponding to the joint pipe 76 so as to be spanned between the left-hand and the right-hand lateral tanks 75. A pair of the cooling fans 71 are attached on the right and left to the inside of the support plate 70 with bolts 80. Attachment portions 81 formed on both ends of the support plate 70 are superposed on the corresponding attachment bosses 78 and are secured thereto with bolts 82. The support plate 70 is provided to cover almost the upper half portion of the rear surface of the radiator 26.

The pair of left and right cooling fans 71 is supported on the left and right insides of the support plate 70 with the vehicle body centerline C therebetween. The left and right cooling fans 71 have the same specifications and turn in the same direction. The interval d between the left and right cooling fans 71 is such a relatively narrow dimension that the cooling fans 71 will not function because of mutual interference, unless the specific device of the present invention is provided.

Figure 7:
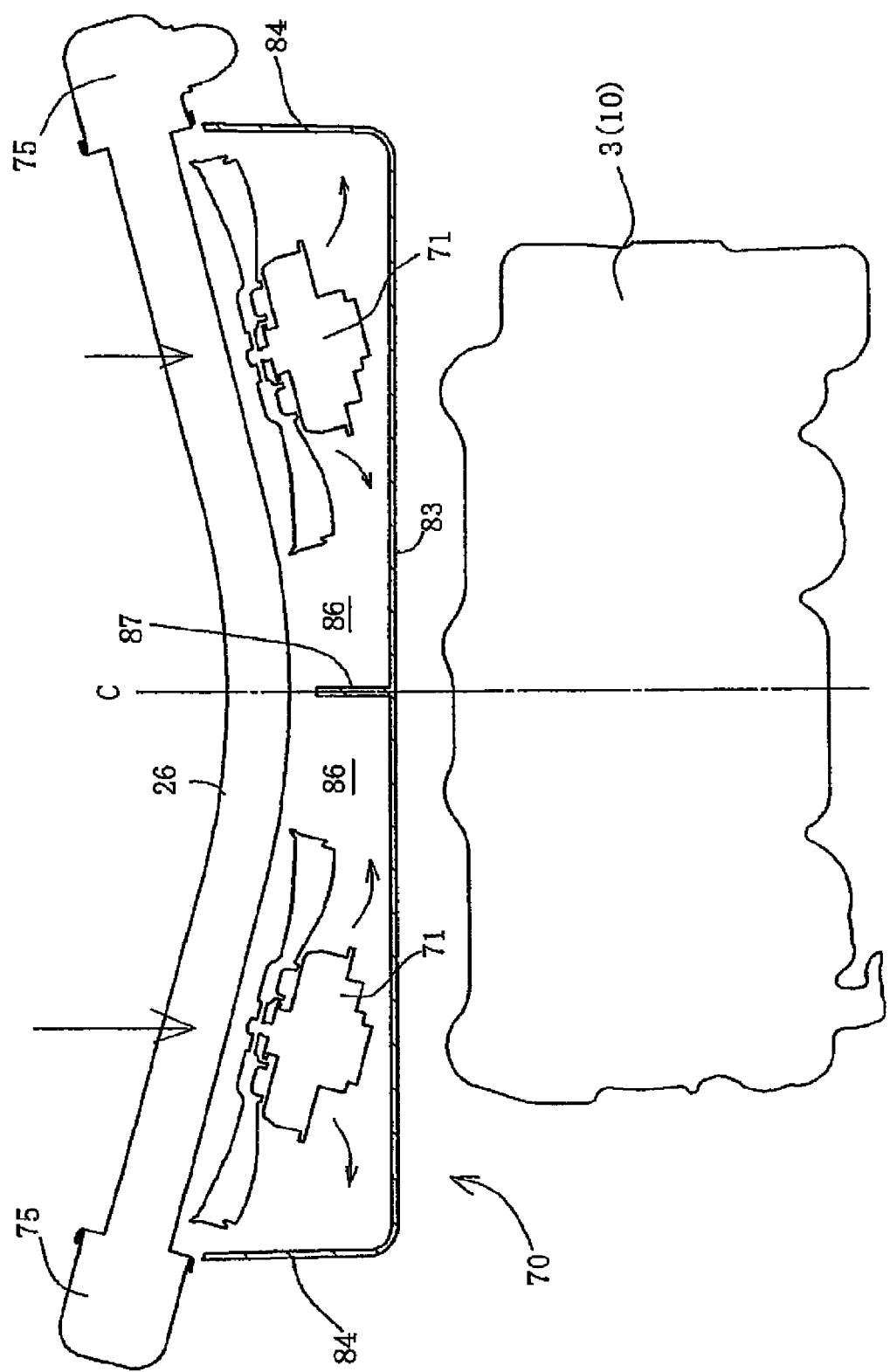
FIG. 7 is a cross-sectional view taken along line 3-3 of FIG. 3.

FIG. 7 is a cross-sectional view taken along line 7-7 of FIG. 3. The radiator 26 bends to protrude rearward so that its central portion protrudes the furthest rearward. The support plate 70 is attached to cover the rear surface of the radiator 26 in the range inside of the lateral tanks 75. Each of the cooling fans 71 is obliquely arranged along the rear surface, of the radiator, extending obliquely toward the rearward and has an external circumferential portion that is provided at a position external of the vehicle body centerline C and close to the lateral tank 75.

The support plate 70 is made of rigid resin or of an appropriate metal and is composed of a rear wall 83, left and right lateral surfaces 84 and an upper wall 85 (see FIG. 8) described later to close a space 86 rearward of the radiator 26. However, only the lower portion of the space 86 is open. A partition portion 87 is formed like a rib at the center of the rear wall 83 so as to project forward along the vehicle body centerline C.

The partition portion 87 projects between the left and right cooling fans 71 and sections the space 86 receiving the cooling fans 71 therein into respective sub-spaces for the cooling fans 71. This prevents the cooling air of the adjacent cooling fans 71 from interfering with each other. The cooling air of each of the cooling fans 71 passes through a corresponding one of the spaces 86 receiving therein the respective cooling fans 71 and flows downward.

Figure 8:
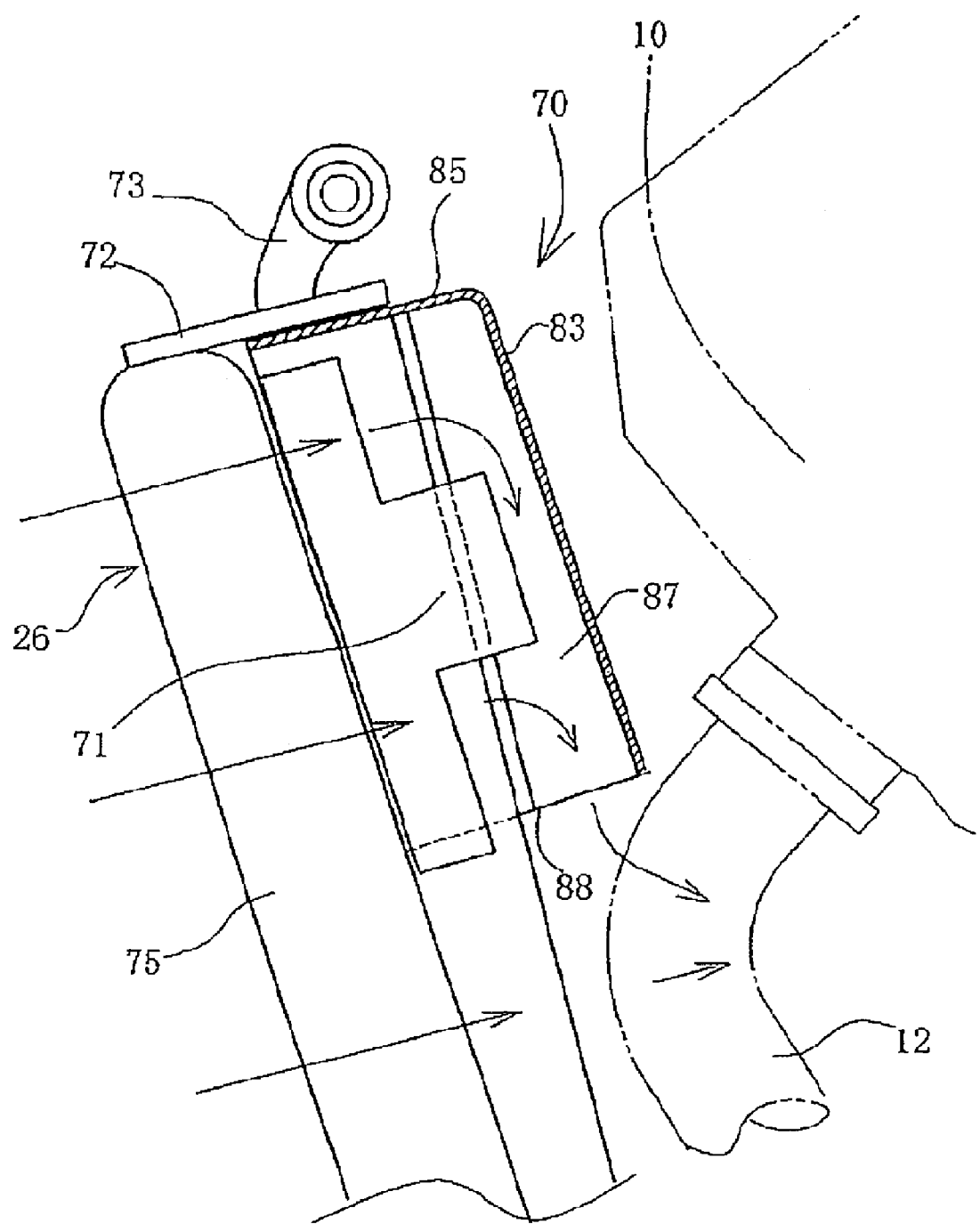
FIG. 8 is a cross-sectional view taken along line 8-8 of FIG. 6.

FIG. 8 is a cross-sectional view taken along line 8-8 of FIG. 6. The upper end, namely, the upper wall 85, of the support plate 70 is in close contact with the upper frame 72 to close the space 86 from above. The partition portion 87 extends upward and downward while maintaining an approximately constant interval from the rearmost portion projecting rearward from the central portion of the radiator 26. In addition, the partition portion 87 is provided to correspond to the vertical width of the support plate 70.

The rear wall 83 and the lateral walls 84 extend to a lower end portion 88, which is an open end. Thus, the space surrounded by the rear surface of the radiator 26 and the support plate 70 opens only downward, whereby cooling air passes through the opening portion downward and moves toward the engine rearward thereof.

A description will now be provided of the operation of the present invention. As shown in FIG. 7, the partition portion 87 is formed to project inward from the rear wall 83 of the support plate 70 along the vehicle body centerline C and the cooling fans 71 are provided, on the right and left, on both sides of the partition portion 87. The cooling fans 71 can be disposed close to each other while being prevented from interfering with each other. It is not necessary to enlarge the horizontal width of the radiator 26 in order to arrange the cooling fans 71, that is, the horizontal width of the radiator can be made compact. This eliminates the enlargement of the vehicle-width, thereby realizing a compact vehicle body.

Furthermore, since the radiator 26 bends such that the central portion protrudes rearward and the cooling fans 71 are respectively disposed leftward and rightward outside of this protrusion, the radiator 26 can be disposed closer to the engine 3.

Additionally, since the cooling fans 71 have the same specifications and rotate in the same direction, cost increases can be held down and parts control can be facilitated.

As shown in FIG. 8, the support plate 70 of the cooling fans 71 is made to serve as a cover member covering the rear surface of the radiator 26 and is provided with the open portion at the lower portion thereof. Therefore, the cooling air from the cooling fans 71 can be made by the support plate 70 to move downward and flow rearward from the open portion of the lower end portion 88. In other words, heated air which is the exhaust air from the radiator after heat exchange is prevented from moving toward the air intake box 9 and toward the fuel tank 8 both located rearward of and upward of the radiator 26. This makes it possible to introduce relatively cool outside air to the air intake box 9 to thereby increase the filling efficiency of intake air.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling device for a motorcycle engine, comprising:
a radiator disposed in a space forward of a water-cooled engine and rearward of a front wheel; and
right and left cooling fans disposed on a rear surface of the radiator,
wherein the radiator is bent at a center thereof, the right and left cooling fans rotate in the same direction and are disposed on a right and left of a centerline of the vehicle body, respectively, a support member that supports the right and left cooling fans is provided rearward of the radiator, and a partition portion is provided on the support member on the centerline of the vehicle body to prevent exhaust air of the left and right cooling fans from interfering with each other, and
wherein the support member is a cover member that covers a rear of the radiator and that includes an upper wall, right and left lateral walls and a rear wall so as to virtually close a space rearward of the radiator, a lower surface of the space being left open.

2. The cooling device for a motorcycle engine according to claim 1, wherein front side exhaust pipes are vertically passed through a gap between a rear of the radiator and a front of the water-cooled engine.

3. The cooling device for a motorcycle engine according to claim 1, wherein the radiator has an inverted trapezoid shape with a wide upper portion and a narrow lower portion, and the radiator is provided with right and left lateral tanks.

4. The cooling device for a motorcycle engine according to claim 1, wherein the radiator is bent so that a central portion thereof protrudes the furthest rearward with right and left tanks of the radiator being located the furthest forward.

5. The cooling device for a motorcycle engine according to claim 4, wherein the radiator includes right and left portions that respectively extend obliquely from a center of the radiator to the right and left tanks of the radiator, and the right and left cooling fans are obliquely arranged along the rear surfaces of the right and left portions of the radiator, respectively.

6. A cooling device for a motorcycle engine, comprising:
a radiator disposed in a space forward of a water-cooled engine and rearward of a front wheel; and
right and left cooling fans disposed on a rear surface of the radiator,
wherein the radiator is bent at a center thereof, the right and left cooling fans rotate in the same direction and are disposed on a right and left of a centerline of the vehicle body, respectively, a support member that supports the right and left cooling fans is provided rearward of the radiator, and a partition portion is provided on the support member on the centerline of the vehicle body to prevent exhaust air of the left and right cooling fans from interfering with each other, and
wherein a lower end of the radiator is supported by a crankcase of the water-cooled engine via a stay that extends forward from a front lower portion of the crankcase.

7. The cooling device for a motorcycle engine according to claim 6, wherein a feed-water hose extends rearward from a lateral tank of the radiator and connects with a feed-water pump provided at a lateral portion of the crankcase.

8. A cooling device for a motorcycle engine, comprising:
a radiator disposed in a space forward of a water-cooled engine and rearward of a front wheel; and
right and left cooling fans disposed on a rear surface of the radiator,
wherein the radiator is bent at a center thereof, the right and left cooling fans rotate in the same direction and are disposed on a right and left of a centerline of the vehicle body, respectively, a support member that supports the right and left cooling fans is provided rearward of the radiator, and a partition portion is provided on the support member on the centerline of the vehicle body to prevent exhaust air of the left and right cooling fans from interfering with each other, and
wherein the partition portion extends forward of the support member between the right and left cooling fans.

9. The cooling device for a motorcycle engine according to claim 8, wherein a space between the left and right cooling fans is such a relatively narrow dimension that the left and right cooling fans would not function because of mutual interference, except that the partition portion is provided between the left and right cooling fans.

* * * * *